United States Patent
Kang et al.

(10) Patent No.: US 9,042,314 B2
(45) Date of Patent: May 26, 2015

(54) METHOD FOR PERFORMING RETRANSMISSION IN MIMO WIRELESS COMMUNICATION SYSTEM AND APPARATUS THEREFOR

(75) Inventors: Byeong Woo Kang, Anyang-si (KR); Dong Wook Roh, Anyang-si (KR); Yu Jin Noh, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 571 days.

(21) Appl. No.: 13/386,015

(22) PCT Filed: Aug. 2, 2010

(86) PCT No.: PCT/KR2010/005071
§ 371 (c)(1),
(2), (4) Date: Jan. 19, 2012

(87) PCT Pub. No.: WO2011/021795
PCT Pub. Date: Feb. 24, 2011

(65) Prior Publication Data
US 2012/0269137 A1    Oct. 25, 2012

Related U.S. Application Data

(60) Provisional application No. 61/235,680, filed on Aug. 20, 2009.

(30) Foreign Application Priority Data

Apr. 5, 2010  (KR) .......................... 10-2010-0030754

(51) Int. Cl.
*H04L 5/00*   (2006.01)
*H04B 7/04*   (2006.01)
(Continued)

(52) U.S. Cl.
CPC ........... *H04L 5/0023* (2013.01); *H04W 74/004* (2013.01); *H04W 72/042* (2013.01);
(Continued)

(58) Field of Classification Search
CPC .... H04L 5/0023; H04L 5/0055; H04W 72/04
USPC .......................................... 370/329; 714/748
See application file for complete search history.

(56) References Cited

U.S. PATENT DOCUMENTS 8,245,092 B2 *   8/2012  Kotecha et al. ............... 714/748
2005/0220042 A1  10/2005  Chang et al.
(Continued)

FOREIGN PATENT DOCUMENTS

WO    2009064059    5/2009

*Primary Examiner* — Mark Rinehart
*Assistant Examiner* — Gbemileke Onamuti
(74) *Attorney, Agent, or Firm* — Lee, Hong, Degerman, Kang & Waimey

(57) ABSTRACT

A method for performing retransmission at a user equipment of a MIMO wireless communication system is disclosed. The method comprises transmitting multiple transport blocks to a base station for a transmission unit time in accordance with uplink grant information, which includes a first new data indicator; receiving ACK/NACK (Acknowledgement/Negative-ACK) responses corresponding to the respective transport blocks and uplink grant information, which includes a second new data indicator, from the base station; and performing new transmission or retransmission for the multiple transport blocks in one transport block unit for a transmission unit time in accordance with the ACK/NACK responses and the second new data indicator, if transport rank is reduced to 1.

10 Claims, 11 Drawing Sheets

(51) Int. Cl.
*H04L 1/16* (2006.01)
*H04W 74/00* (2009.01)
*H04W 72/04* (2009.01)

(52) U.S. Cl.
CPC ............ *H04W 72/04* (2013.01); *H04B 7/0404* (2013.01); *H04B 7/0413* (2013.01); *H04L 1/1671* (2013.01); *H04L 5/0055* (2013.01)

(56) References Cited

U.S. PATENT DOCUMENTS

2010/0098006 A1\* 4/2010 Golitschek Edler Von Elbwart et al. .............................. 370/329
2011/0182245 A1\* 7/2011 Malkamaki et al. .......... 370/329

\* cited by examiner (a) control - plane protocol stack (b) user - plane protocol stack

METHOD FOR PERFORMING RETRANSMISSION IN MIMO WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2010/005071, filed on Aug. 2, 2010, which claims the benefit of earlier filing date and right of priority to Korean Application No. 10-2010-0030754, filed on Apr. 5, 2010, and also claims the benefit of U.S. Provisional Application Ser. No. 61/235,680, filed on Aug. 20, 2009, the contents of which are all hereby incorporated by reference herein in their entirety.

TECHNICAL FIELD

The present invention relates to a wireless communication system, and more particularly, to a method for performing retransmission in a MIMO wireless communication system and an apparatus therefor.

BACKGROUND ART

Multiple-Input Multiple-Output (MIMO) means a scheme that multiple transmitting antennas and multiple receiving antennas are used. Transmission and reception efficiency can be improved by the MIMO scheme. Namely, a transmitting side or receiving side of a wireless communication system can enhance capacity and improve throughput by using multiple antennas. Hereinafter, MIMO may be referred to as 'MIMO antenna'.

The MIMO antenna technology does not depend on a signal antenna path to receive a whole message. Instead, in the MIMO antenna technology, data fragments received from multiple antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay station. According to the MIMO antenna technology, it is possible to overcome limitation of a transmission rate in mobile communication according to the related art where a single antenna is used.

A schematic view of a general MIMO communication system is illustrated in FIG. 1. Referring to FIG. 1, $N_T$ number of transmitting antennas are provided at a transmitting side while $N_R$ number of receiving antennas are provided at a receiving side. If multiple antennas are used at both the transmitting side and the receiving side, theoretical channel transmission capacity is more increased than that multiple antennas are used at any one of the transmitting side and the receiving side. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used can be increased theoretically as expressed by the following Equation 1 as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R) \quad \text{[Equation 1]}$$

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 1, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information can be expressed by a vector shown in Equation 2 as follows.

$$s = [s_1, s_2, \ldots, s_{N_T}]^T \quad \text{[Equation 2]}$$

Meanwhile, different kinds of transmission power can be applied to each of the transmission information $s_1, s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix w is applied to the information vector $\hat{s}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ can be expressed by Equation 5 below using a vector x. In this case, $w_{ij}$ means a weight value between the ith transmitting antenna and the jth information. w may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

Meanwhile, a concept of a codeword used in a MIMO communication system will be described below. In a general communication system, in order to correct an error of a channel at the receiving side, information transmitted to the transmitting side is coded using a forward error correction code and then transmitted to the transmitting side. The receiving side demodulates the received signal, decodes the error correction code, and recovers the transmission information. The error on the received signal, which is generated by the channel, is corrected through the decoding process as above. A separate specific coding process is required for error detection separately from the error correction coding process. In this case, a cyclic redundancy check (CRC) code is widely used as the error detection code. The CRC is one of coding methods used for error detection not error correction. It is general that transmission information is coded using CRC and then a forward error correction code is used for the CRC coded information. Generally, one unit coded by CRC and error correction code will be referred to as a "codeword".

Meanwhile, the number of rows and columns of a channel matrix H indicating the status of the channel is determined by the number of transmitting and receiving antennas. Namely, the number of rows of the channel matrix H is equal to the number $N_R$ of receiving antennas while the number of columns of the channel matrix H is equal to the number $N_T$ of transmitting antennas. Namely, the channel matrix H becomes $N_R * N_T$ matrix.

Generally, a rank in the channel matrix may physically mean the maximum number of rows or columns that can transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H) \leq \min(N_T, N_R) \quad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that can transmit different kinds of information. Accordingly, the channel matrix H can be expressed by the following Equation 7.

$$\text{\# of streams} \leq \text{rank}(H) \leq \min(N_T, N_R) \quad \text{[Equation 7]}$$

In this case, "# of streams" represents the number of streams. Meanwhile, it is to be understood that one stream can be transmitted through one or more antennas.

Various methods for corresponding one or more streams to several antennas can exist. These methods can be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme can exist.

Hereinafter, a hybrid automatic repeat request (HARQ) scheme will be described. The HARQ scheme can improve system throughput by combination of channel coding and ARQ scheme. If the transmitting side successfully decodes a data block, it transmits ACK (Acknowledgement) response to the transmitting side. If not so (namely, if decoding is failed), the receiving side transmits NACK (Negative-ACK) response to the transmitting side. Then, the transmitting side retransmits the corresponding data block. If the transmitting side receives ACK response and has data to be transmitted, it transmits new data.

HARQ operation can be divided into a synchronous HARQ operation and an asynchronous HARQ operation depending on transmission timing. In the asynchronous HARQ operation, as retransmission timing is not fixed, an indicator indicating whether current transmission is retransmission or not will be required. On the other hand, in the synchronous HARQ operation, if initial transmission is failed, retransmission is always performed after transmission duration of eight times (if eight HARQ processes exist) from initial transmission.

Hereinafter, an example of a process for processing the aforementioned data block will be described. First of all, a CRC bit is attached to a data block (hereinafter, referred to as 'transport block (TB)'). If multiple transport blocks are transmitted from the transmitting side for one transmission time interval (TTI), the receiving side can transmit multiple ACK/NACK information to the transmitting side. Unlike this, if multiple transport blocks are transmitted for one TTI, single ACK/NACK information may be transmitted to the transmitting side.

In the MIMO system, multiple transport blocks can be transmitted to one TTI. At this time, if the size of the transport block is greater than a predetermined threshold value, each transport block can be segmented by multiple code blocks. Each code block is processed by encoding and rate matching. Afterwards, each code block passes through concatenation of code block and a channel interleaver in due order.

Data channel-interleaved by the channel interleaver should be mapped with time, frequency and space resource elements. An example of mapping for such spatial resources (i.e., layer) will be described with reference to Table 1 below.

TABLE 1

| Transmission rank | Mapping to layer |
|---|---|
| 1 | $s^1(i) = d^1(i)$ |
| 2 | $s^1(i) = d^1(i) s^2(i) = d^2(i)$ |
| 2 | $s^1(i) = d^1(2i) s^2(i) = d^1(2i + 1)$ |
| 3 | $s^1(i) = d^1(i) s^2(i) = d^2(2i) s^3(i) = d^2(2i + 1)$ |
| 4 | $s^1(i) = d^1(2i) s^2(i) = d^1(2i + 1) s^3(i) = d^2(2i) s^4(i) = d^2(2i + 1)$ |

In Table 1, $s^k(i)$ (k=1, 2, 3, 4) represents data mapped by the kth layer at the ith index, and $d^j(i)$ (j=1,2) represents data mapped by the jth transport block (TB) at the ith index. Rank 1 supports a single transport block that can be mapped with layer 1. Rank 2 supports two transport blocks that can be mapped with layer 1 and layer 2, respectively. Also, rank 3 supports two transport blocks, wherein the transport block 1 is mapped with layer 1 and the transport block 2 is mapped with layer 2 and layer 3. Moreover, rank 4 supports two transport blocks, wherein the transport block 1 is mapped with layer 1 and layer 2, and the transport block 2 is mapped with layer 3 and layer 4.

In respect of the aforementioned MIMO technology, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate. In particular, an efficient HARQ operation method of a user equipment that transmits multiple transport blocks under the MIMO environment should be defined.

DISCLOSURE OF INVENTION

Technical Problem

Accordingly, the present invention is directed to a method for performing retransmission in a MIMO wireless communication system and an apparatus therefor, which substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for performing retransmission at a user equipment of a MIMO wireless communication system comprises transmitting multiple transport blocks to a base station for a transmission unit time in accordance with uplink grant information, which includes a first new data indicator; receiving ACK/NACK (Acknowledgement/Negative-ACK) responses corresponding to the respective transport blocks and uplink grant information, which includes a second new data indicator, from the base station; and performing new transmission or retransmission for the multiple transport blocks in one transport block unit for a transmission unit time in accordance with the ACK/NACK responses and the second new data indicator, if transport rank is reduced to 1.

Specifically, if the ACK/NACK responses are all ACK responses and the second new data indicator has a value different from that of the first new data indicator, the step of performing new transmission or retransmission further includes flushing a buffer corresponding to one of the multiple transport blocks, which is intended for new transmission. Also, if the ACK/NACK responses includes at least one ACK response and at least one NACK response and the second new data indicator has the same value as that of the first new data indicator, the step of performing new transmission or retransmission further includes maintaining a buffer corresponding to the transport block that has received the NACK response. Finally, if the ACK/NACK responses are all NACK responses and the second new data indicator has the same value that of the first new data indicator, the step of performing new transmission or retransmission further includes maintaining buffers corresponding to the respective transport blocks.

In another aspect of the present invention, a method for performing retransmission at a user equipment of a MIMO wireless communication system comprises transmitting multiple transport blocks to a base station for a transmission unit time in accordance with uplink grant information, which includes a first new data indicator; receiving ACK/NACK (Acknowledgement/Negative-ACK) responses corresponding to the respective transport blocks and uplink grant information, which includes a second new data indicator, from the base station; and performing new transmission or retransmission for the multiple transport blocks in one transport block unit for a transmission unit time in accordance with the ACK/NACK responses and the second new data indicator, if transport rank is maintained.

Specifically, if the ACK/NACK responses are all ACK responses and the second new data indicator has a value different from that of the first new data indicator, the step of performing new transmission or retransmission further includes flushing buffers corresponding to the multiple transport blocks. Also, if the ACK/NACK responses includes at least one ACK response and at least one NACK response and the second new data indicator has the same value as that of the first new data indicator, the step of performing new transmission or retransmission further includes maintaining a buffer corresponding to the transport block that has received the NACK response and flushing a buffer corresponding to the transport block that has received the ACK response. Finally, if the ACK/NACK responses are all NACK responses and the second new data indicator has the same value that of the first new data indicator, the step of performing new transmission or retransmission further includes maintaining buffers corresponding to the respective transport blocks.

In still another aspect of the present invention, a method for performing retransmission at a user equipment of a MIMO wireless communication system comprises transmitting a first transport block to a base station for a transmission unit time in accordance with uplink grant information, which includes a first new data indicator; receiving ACK/NACK (Acknowledgement/Negative-ACK) response corresponding to the first transport block and uplink grant information, which includes a second new data indicator, from the base station; and performing new transmission for a second transport block and new transmission or retransmission for the first transport block in accordance with the ACK/NACK response and the second new data indicator, if transport rank is increased, wherein the second new data indicator has a value different from that of the first new data indicator.

Specifically, if the ACK/NACK response is ACK response, the step of performing new transmission or retransmission further includes flushing a buffer corresponding to the first transport block and a buffer corresponding to the second transport block. Also, if the ACK/NACK response is NACK response, the step of performing new transmission or retransmission further includes maintaining a buffer corresponding to the first transport block and flushing a buffer corresponding to the second transport block.

In further still another aspect of the present invention, a user equipment comprises a processor; and a radio frequency (RF) module supporting MIMO antennas and transmitting and receiving a radio signal to and from the outside under the control of the processor, wherein the processor transmits multiple transport blocks to a base station for a transmission unit time in accordance with uplink grant information, which includes a first new data indicator, receives ACK/NACK (Acknowledgement/Negative-ACK) responses corresponding to the respective transport blocks and uplink grant information, which includes a second new data indicator, from the base station, and performs new transmission or retransmission for the multiple transport blocks in one transport block unit for a transmission unit time in accordance with the ACK/NACK responses and the second new data indicator, if transport rank is reduced to 1.

In further still another aspect of the present invention, a user equipment comprises a processor; and a radio frequency (RF) module supporting MIMO antennas and transmitting and receiving a radio signal to and from the outside under the control of the processor, wherein the processor transmits multiple transport blocks to a base station for a transmission unit time in accordance with uplink grant information, which includes a first new data indicator, receives ACK/NACK (Acknowledgement/Negative-ACK) responses corresponding to the respective transport blocks and uplink grant information, which includes a second new data indicator, from the base station, and performs new transmission or retransmission for the multiple transport blocks in one transport block unit for a transmission unit time in accordance with the ACK/NACK responses and the second new data indicator, if transport rank is maintained.

In further still another aspect of the present invention, a user equipment comprises a processor; and a radio frequency (RF) module supporting MIMO antennas and transmitting and receiving a radio signal to and from the outside under the control of the processor, wherein the processor transmits a first transport block to a base station for a transmission unit time in accordance with uplink grant information, which includes a first new data indicator, receives ACK/NACK (Acknowledgement/Negative-ACK) response corresponding to the first transport block and uplink grant information, which includes a second new data indicator, from the base station, and performs new transmission for a second transport block and new transmission or retransmission for the first transport block in accordance with the ACK/NACK response and the second new data indicator, if transport rank is increased, and the second new data indicator has a value different from that of the first new data indicator.

Advantageous Effects of Invention

According to the embodiment of the present invention, the user equipment can effectively perform retransmission under the MIMO wireless communication system.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 is a block diagram illustrating a user equipment according to the embodiment of the present invention.

MODE FOR THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Herein, a 3GPP LTE system will be referred to as an LTE system or a legacy system. Also, a user equipment that supports the LTE system will be referred to as an LTE user equipment or a legacy user equipment. A 3GPP LTE-A system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary, and the embodiment of the present invention may easily be applied to H-FDD mode or TDD mode through modifications.

Figure 1:
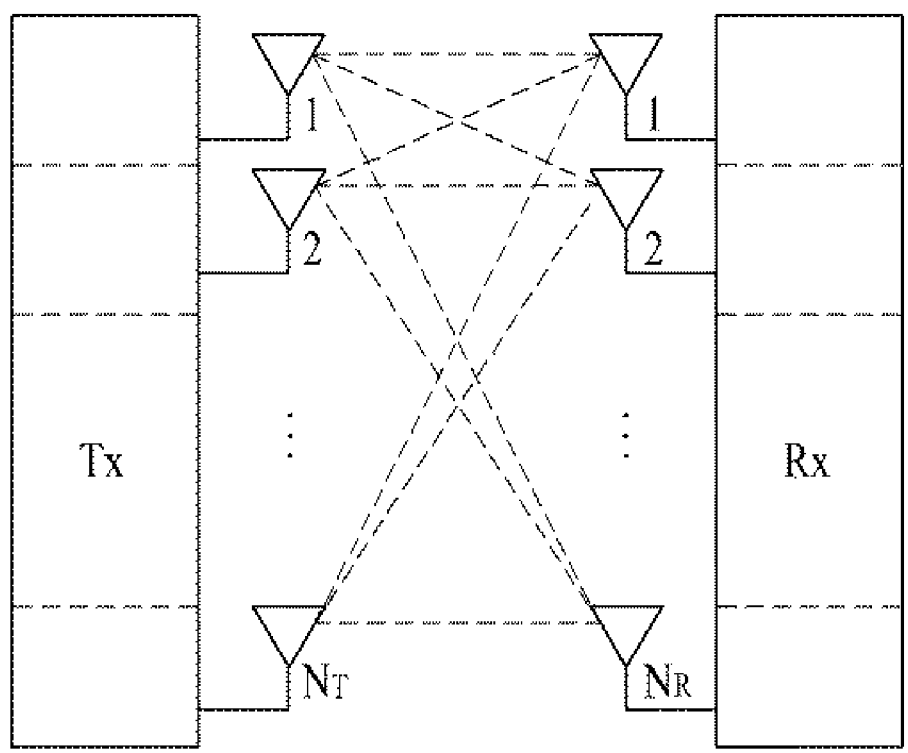
FIG. 1 is a schematic view illustrating a general MIMO communication system.
Figure 2:
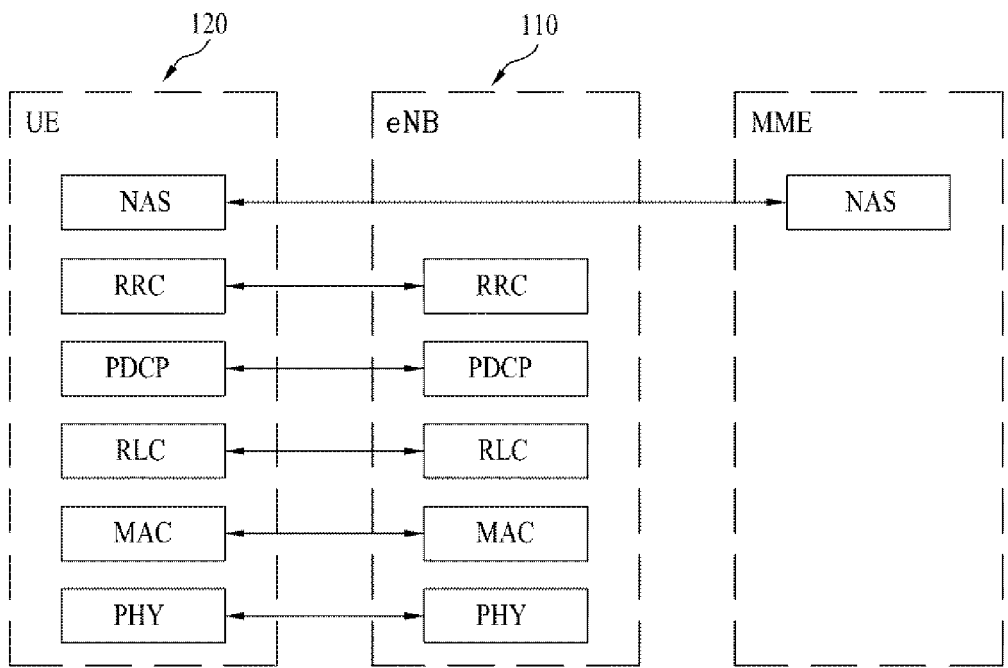
FIG. 2 is a diagram illustrating structures of a control plane and a user plane of a radio interface protocol between one user equipment and E-UTRAN based on the 3GPP radio access network standard.
Figure 2:
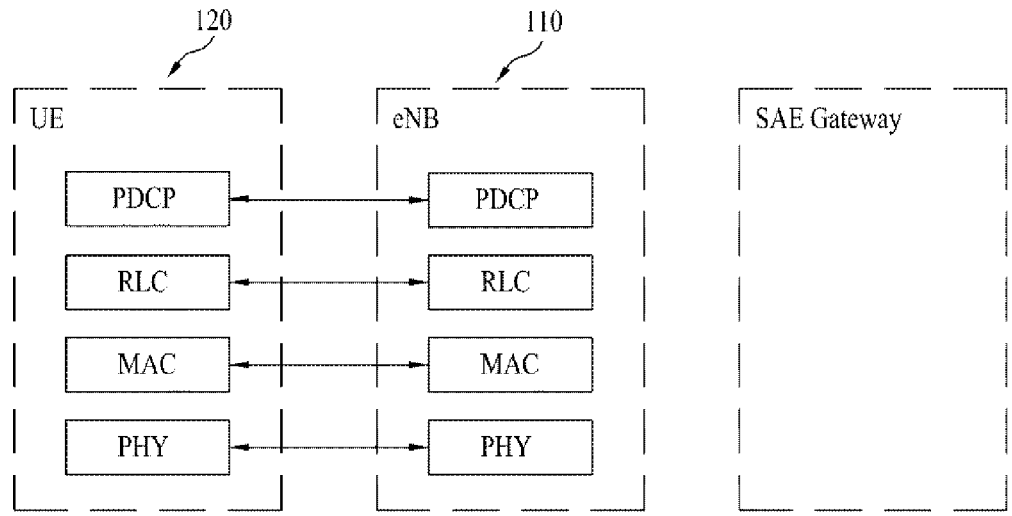

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer located above the physical layer via a transport channel. Data are transferred between the medium access control layer and the physical layer via the transport channel. Data are transferred between the physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB is established at one of bandwidths of 1.25, 2.5, 5, 10, 15, and 20 Mhz and provides a downlink or uplink transmission service to several user equipments. At this time, different cells can be configured to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
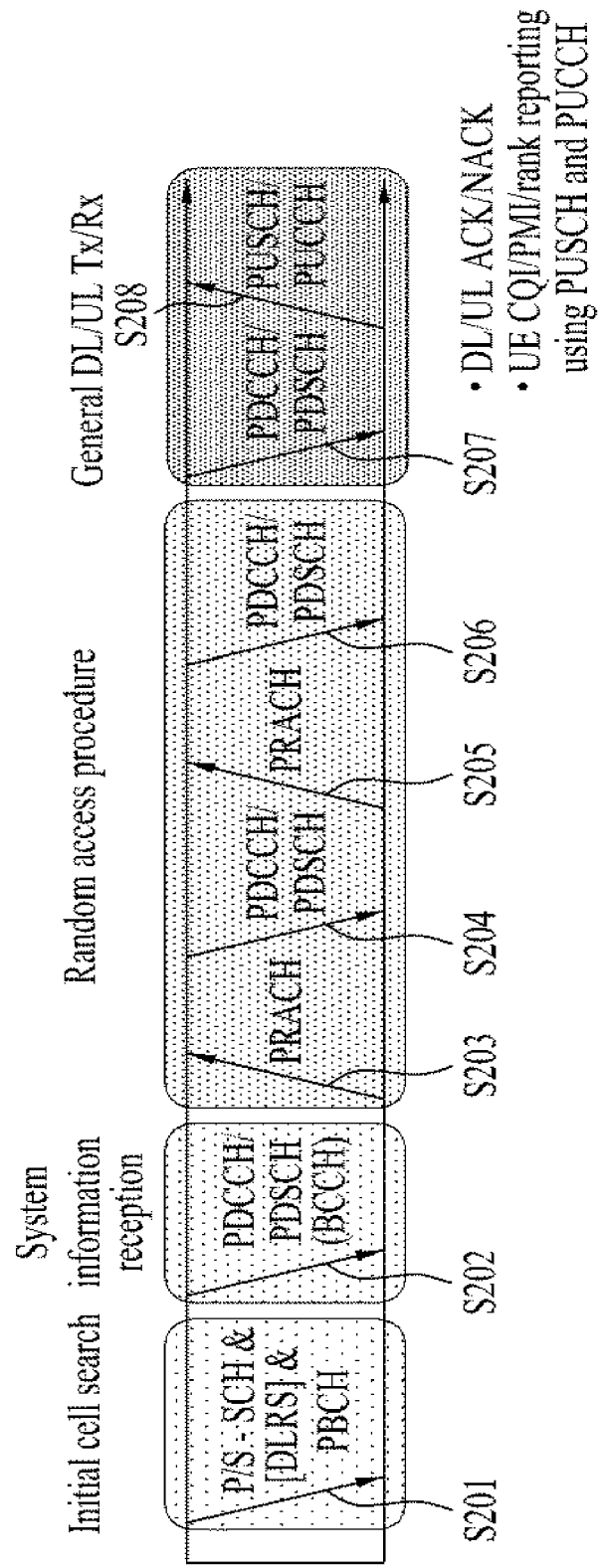
FIG. 3 is a diagram illustrating physical channels used in a 3GPP system and a method for transmitting a general signal using the physical channel.

FIG. 3 is a diagram illustrating physical channels used in a 3GPP system and a method for transmitting a general signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PD-CCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as general a procedure of transmitting uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Figure 4:
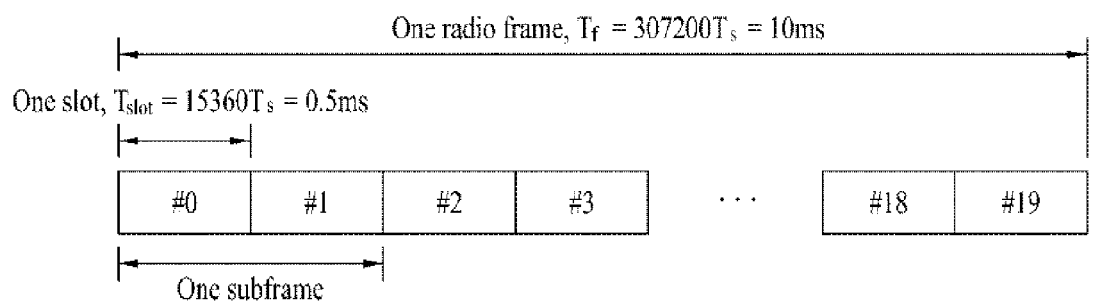
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \times T_s$) and includes 10 subframes of an equal size. Each sub frame has a length of 1 ms and includes two slots. Each slot has a length of 0.5 ms ($15360 \times T_s$). In this case, $T_s$ represents a sampling time, and is expressed by $T_s=1/(15 \text{ kHz} \times 2048)=3.2552 \times 10-8$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
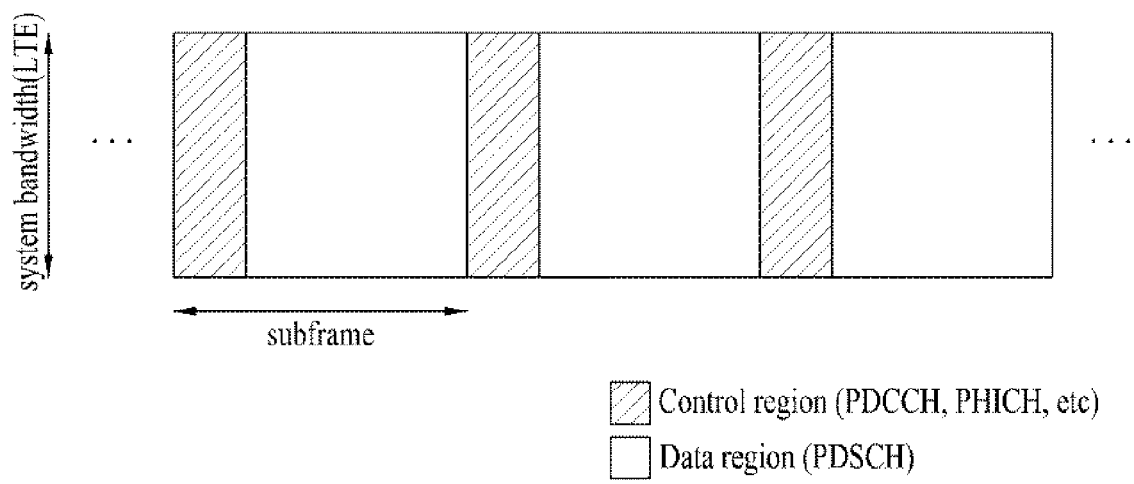
FIG. 5 is a diagram illustrating a structure of a downlink subframe used in an LTE system.

FIG. 5 is a diagram illustrating a structure of a downlink subframe used in an LTE system.

Referring to FIG. 5, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region can have a size set independently per subframe. The control region is used to transmit L1/L2(layer 1/layer 2) control signals. The data region is used to transmit downlink traffic.

Figure 6:
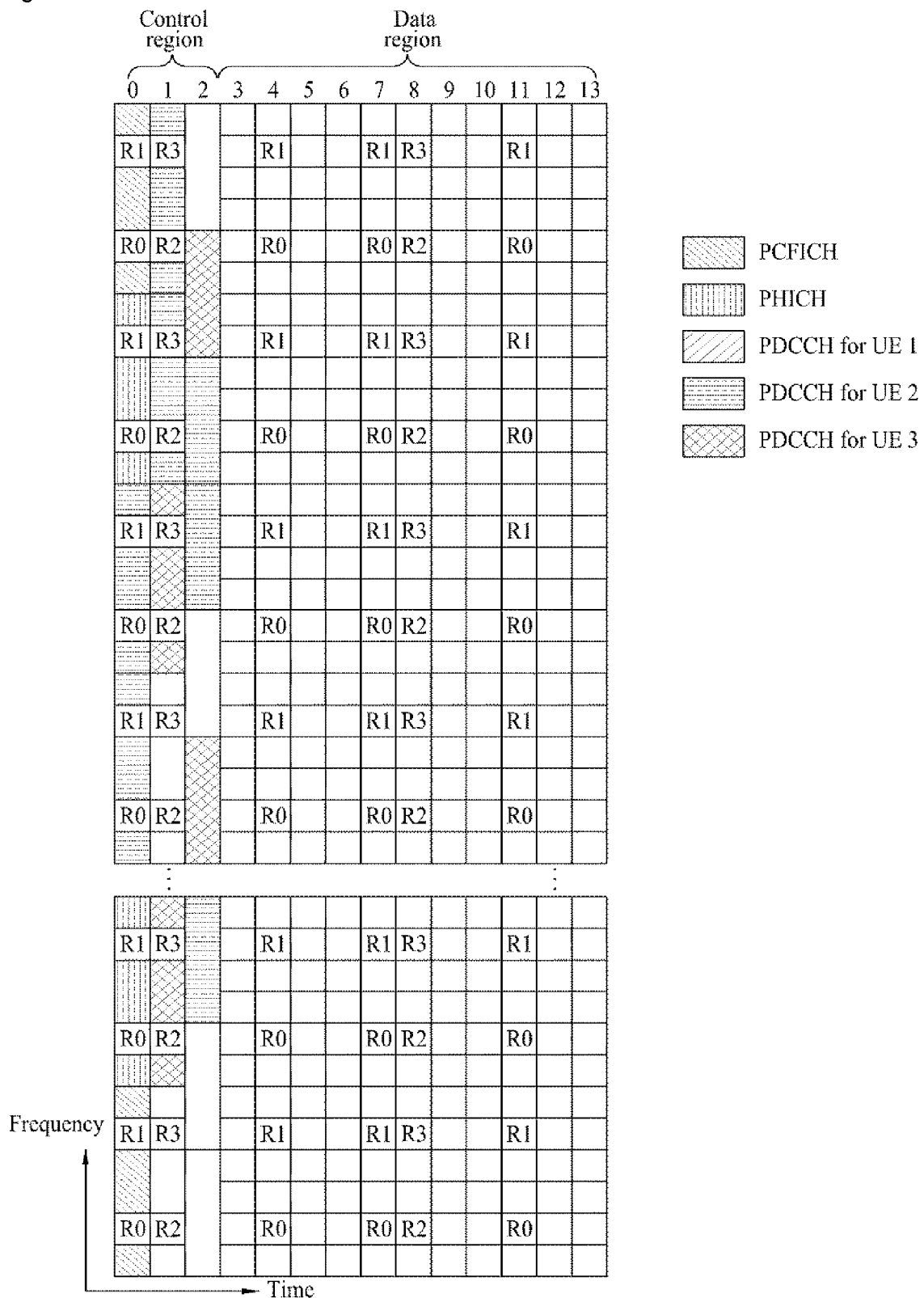
FIG. 6 is a diagram illustrating a control channel included in a control region of one subframe in a downlink radio frame.

FIG. 6 is a diagram illustrating an example of a control channel included in a control region of a subframe in a downlink radio frame.

Referring to FIG. 6, the subframe includes fourteen (14) OFDM symbols. First one to three OFDM symbols are used as the control region in accordance with establishment of subframe, and the other thirteen to eleven OFDM symbols are used as the data region. In FIG. 6, R1 to R4 represent reference signals (RS) or pilot signals of antennas 0 to 3. The RS is fixed by a given pattern within the subframe regardless of the control region and the data region. The control channel is allocated to a resource to which the RS is not allocated in the control region, and the traffic channel is also allocated to a resource to which the RS is not allocated in the data region. Examples of the control channel include PCFICH (Physical Control Format Indicator CHannel), PHICH (Physical Hybrid-ARQ Indicator CHannel), and PDCCH (Physical Downlink Control CHannel).

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to transmit HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are spread by a spreading factor (SF)=2 or 4. A plurality of PHICHs mapped with the same resource constitute a PHICH group. The number of PHICHs multiplexed in the PHICH group is determined by the number of spreading codes. The PHICH group is repeated three times to obtain diversity gain in the frequency region and/or the time region.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The PCH and the DL-SCH are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted through the PDCCH. For example, it is assumed that a specific PDCCH is CRC masked with radio network temporary identity (RNTI) "A," and information of data transmitted using a radio resource (for example, frequency location) "B" and transmission format information (for example, transport block size, modulation mode, coding information, etc.) "C" is transmitted through a specific subframe. In this case, one or more user equipments located in a corresponding cell monitor the PDCCH using their RNTI information, and if there are one or more user equipments having RNTI "A", the user equipments receive the PDCCH, and receive the PDSCH indicated by "B" and "C" through information of the received PDCCH.

Figure 7:
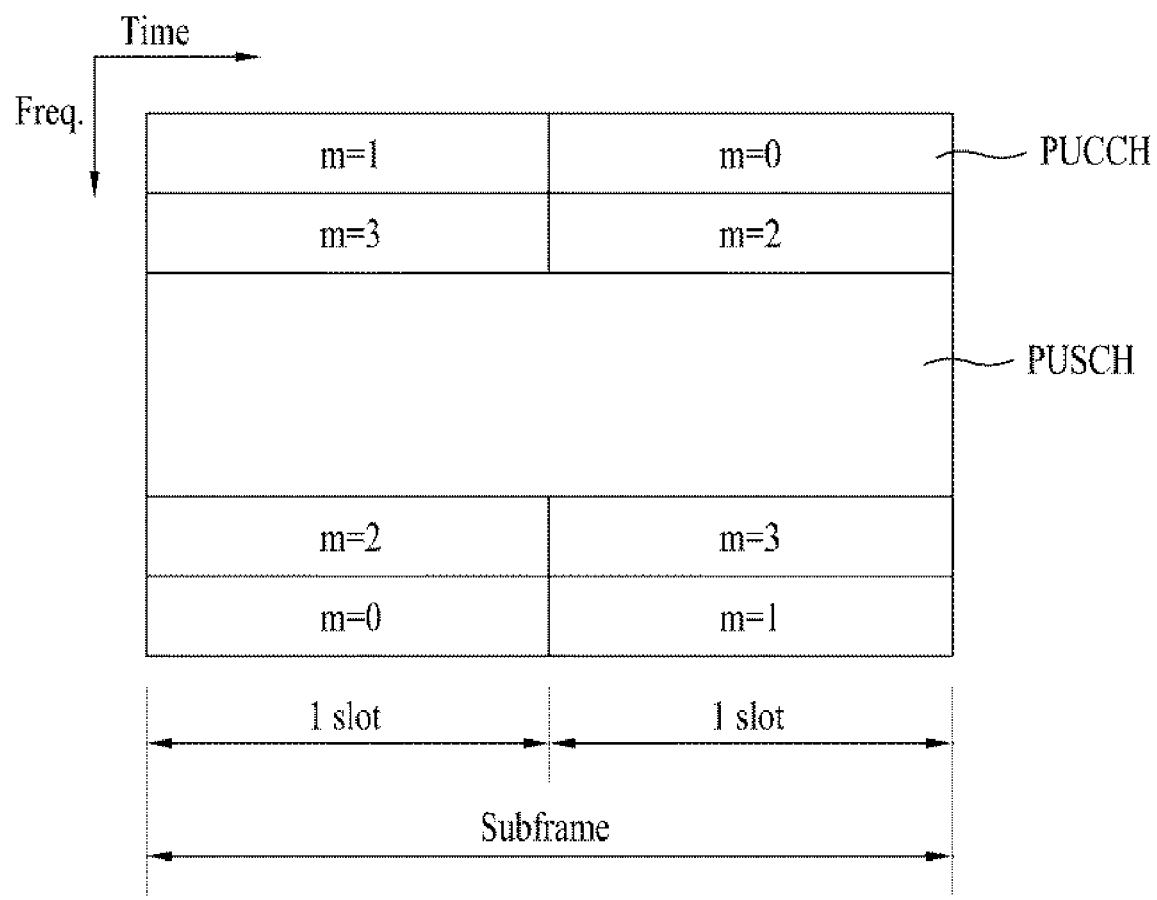
FIG. 7 is a diagram illustrating a structure of an uplink subframe used in an LTE system.

FIG. 7 is a diagram illustrating a structure of an uplink subframe used in an LTE system.

Referring to FIG. 7, the uplink subframe includes a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency region are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 7 exemplarily illustrates that PUCCH of m=0, PUCCH of m=1, PUCCH of m=2, and PUCCH of m=3 are allocated to the subframe.

Figure 8:
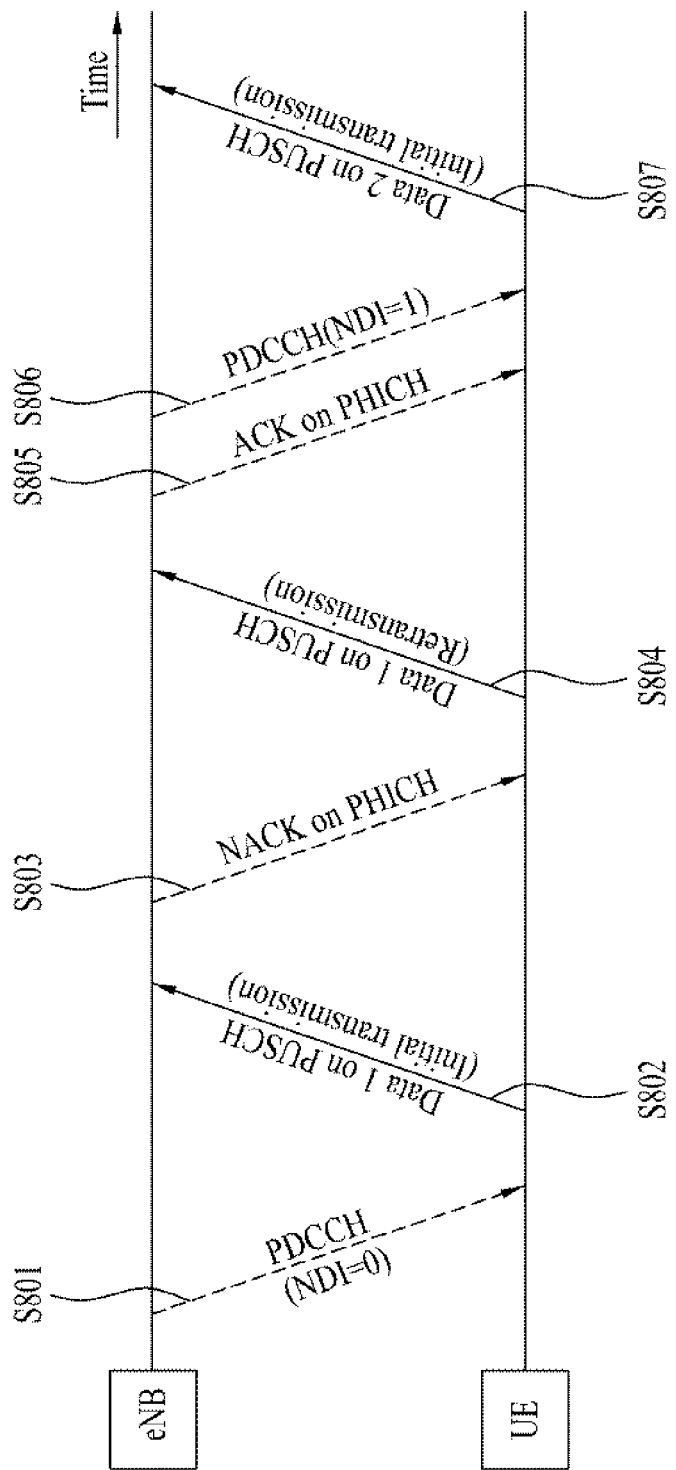
FIG. 8 is a diagram illustrating HARQ operation performed in an LTE system.

FIG. 8 is a diagram illustrating HARQ operation performed in an LTE system.

In FIG. 8, the user equipment (UE) serves as a transmitting side, and a base station (eNode B or eNB) serves as a receiving side. And, it is assumed that an uplink receives HARQ feedback information from the base station. This uplink status can equally be applied to a downlink.

First of all, the base station transmits a downlink control information (DCI) Format 0 transmitted through a physical downlink control channel (PDCCH), which includes uplink scheduling information, i.e., uplink grant, as illustrated in step S801, so that the user equipment transmits data in accordance with the HARQ scheme. Examples of the uplink grant include user equipment identifier (for example, C-RNTI or semi-persistent scheduling C-RNTI), resource block assignment, transmission parameters such as modulation/coding rate and redundancy version (RV), and a new data indicator (NDI).

The user equipment can identify uplink grant transmitted thereto by monitoring the PDCCH per TTI. If the user equipment discovers uplink grant transmitted thereto, it can transmit data (data 1 in FIG. 7) through a physical uplink shared channel (PUSCH), as illustrated in step S802, in accordance with the received uplink grant. At this time, the transmitted data can be transmitted in a medium access control packet data unit (MAC PDU).

As described above, the user equipment, which has performed uplink transmission through the PUSCH, waits to receive feedback information from the base station through a physical hybrid-ARQ indicator channel (PHICH). If NACK for the data 1 is transmitted from the base station as illustrated in step S803, the user equipment retransmits the data 1 for TTI for retransmission of the data 1 as illustrated in step S804.

The user equipment counts the number of transmission times (CURRENT_TX_NB) whenever performing data transmission of one time in accordance with the HARQ scheme. If the number of transmission times (CURRENT_TX_NB) reaches the maximum number of transmissions set by the upper layer, the user equipment flushes a HARQ buffer.

If the user equipment receives ACK for the retransmission data 1 in steps S805 and S806 and receives uplink grant through the PDCCH, it can identify, through a new data indicator (NDI) field, whether data to be currently transmitted is a MAC PDU for initial transmission, or a previous MAC PDU should be retransmitted. The NDI field is a 1-bit field, and is toggled in the order of 0->1->0->1-> . . . whenever a new MAC PDU is transmitted. In case of retransmission, the NDI field has the same value as that of initial transmission. Namely, the user equipment compares the NDI field with a previously transmitted value to identify whether the MAC PDU has been retransmitted.

In FIG. 8, the user equipment recognizes that corresponding transmission is new transmission, through the NDI value set to 0 in step S801 and toggled to '1' in step S806. As a result, the user equipment can transmit data 2 through the PUSCH as illustrated in step S807.

As described above, the ACK/NACK response is received through the PHICH, and the uplink grant is received through the PDCCH. If the user equipment receives the ACK/NACK response and the uplink grant at the same time, it can decide whether to perform retransmission by using the uplink grant only. In other words, the user equipment can decide whether to perform retransmission and reset of the HARQ buffer by identifying the NDI only without identifying the ACK/NACK response.

Meanwhile, in the uplink of the LTE-A system that supports the MIMO system, the user equipment can transmit multiple transport blocks to the base station. In this case, the user equipment can receive ACK/NACK responses to the respective transport blocks through the PHICH in the same manner as the LTE system.

However, since the MIMO system is not applied to uplink transmission in the current LTE system, a problem may occur when the current DCI format 0 for transmitting uplink grant is applied to the LTE-A system. For example, since the user equipment transmits multiple transport blocks to the base station, it is difficult for the user equipment whether to decide retransmission of each of the multiple transport blocks and perform buffer flushing by using NDI information only included in the current uplink grant.

Accordingly, the HARQ operation in the LTE-A system that supports the MIMO system will be described below. In particular, the present invention suggests that the user equipment performs the HARQ operation by using one or more ACK/NACK responses received through the PHICH and uplink grant received through the PDCCH.

For convenience of description, it is assumed that the maximum number of transport blocks that can be transmitted from the user equipment for one TTI is 2. However, it will be apparent to the person with ordinary skill in the art to which the present invention pertains that two or more transport blocks can be transmitted from the user equipment.

Also, it is assumed that the present invention can be applied to 1) the case where the condition for transmitting one transport block is changed to the condition for transmitting two or more transport blocks, 2) the case where the condition for transmitting two or more transport blocks is changed to the condition for transmitting one transport block, and 3) the case where the condition for transmitting two or more transport blocks is maintained. Meanwhile, information as to whether the condition is changed may be included in the uplink grant for signaling, or may be signaled separately.

<Case where the Condition for Transmitting One Transport Block is Changed to the Condition for Transmitting Two or More Transport Blocks>

According to the first embodiment of the present invention, the case where the condition for transmitting one transport block is changed to the condition for transmitting two or more transport blocks, for example, the case where one transport block is additionally transmitted to rank 2 in accordance with change of the channel status while another one is being transmitted to rank 1 will be described. In this case, the user equipment should transmit a new transport block to the base station regardless that the base station has received a previous transport block.

Figure 9:
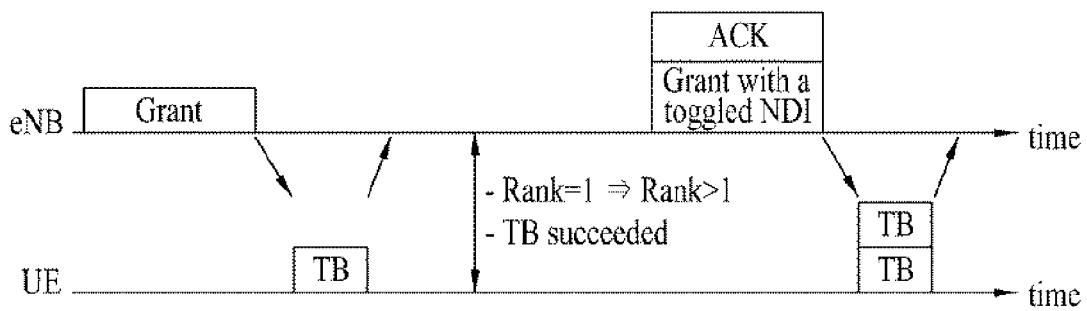
FIG. 9 and FIG. 10 are diagrams illustrating HARQ operation according to the first embodiment of the present invention.
Figure 10:
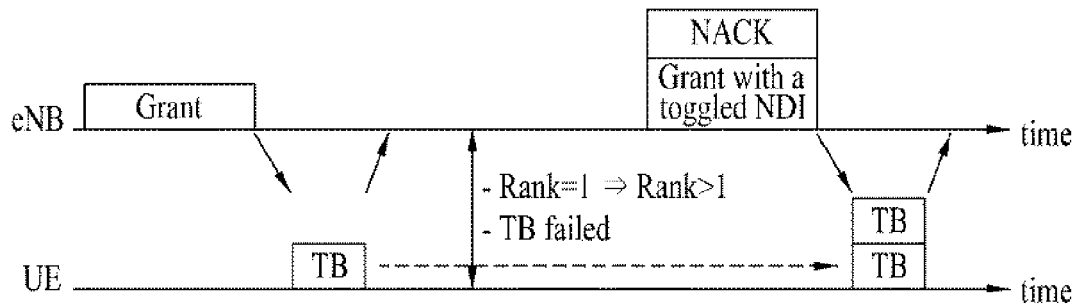

FIG. 9 and FIG. 10 are diagrams illustrating the HARQ operation according to the first embodiment of the present invention. In particular, FIG. 9 illustrates that the base station successfully receives a previously transmitted transport block and transmits ACK response, and FIG. 10 illustrates that the base station fails to receive a previously transmitted transport block and transmits NACK response.

Referring to FIG. 9, if the base station successfully decodes the transport block received from the user equipment, it transmits uplink grant with a toggled NDI and one ACK response to the user equipment. The user equipment flushes a first buffer by identifying the ACK response, and flushes a second buffer for new transmission by identifying the togged NDI.

Also, referring to FIG. 10, if the base station fails to decode the transport block received from the user equipment or to receive the transport block, it transmits uplink grant with a toggled NDI and one NACK response to the user equipment. The user equipment performs retransmission of the transport block stored in the first buffer by identifying the NACK response, and at the same time flushes the second buffer for new transmission by identifying the togged NDI.

In short, in the first embodiment of the present invention, the base station transmits the uplink grant to the user equipment by toggling the NDI for new transmission, and the user equipment, which has received the uplink grant, flushes the buffer for new transmission. Also, the user equipment can decide whether to perform retransmission depending on whether the response received from the base station regardless of the uplink grant is ACK or NACK.

<Case where the Condition for Transmitting Two or More Transport Blocks is Changed to the Condition for Transmitting One Transport Block>

According to the second embodiment of the present invention, the case where the condition for transmitting two or more transport blocks is changed to the condition for transmitting one transport block, for example, the case where one transport block is transmitted to rank 1 in accordance with change of the channel status while two transport blocks are being transmitted to rank 2 will be described. In other words, the user equipment performs retransmission or new transmission of the transport block by using one buffer in the middle of using two buffers.

Figure 11:
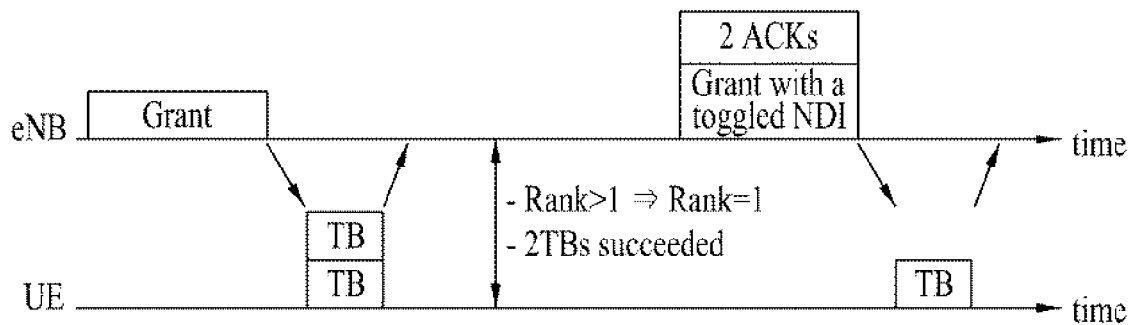
FIG. 11 to FIG. 13 are diagrams illustrating HARQ operation according to the second embodiment of the present invention.
Figure 12:
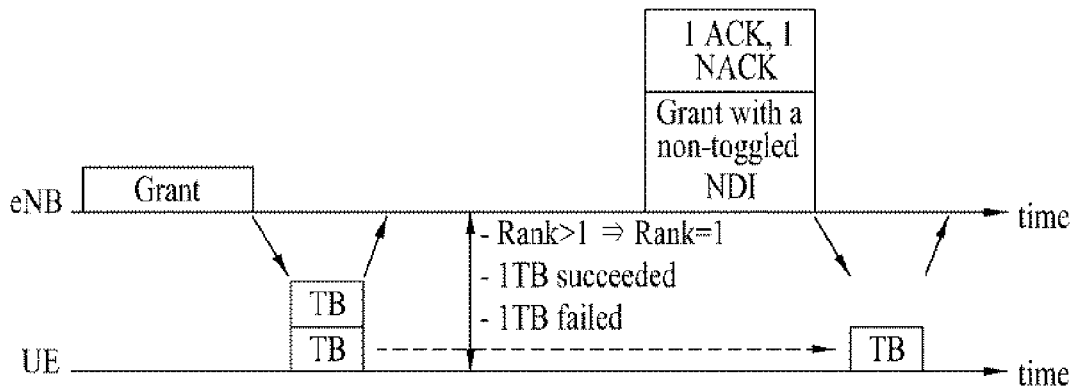
Figure 13:
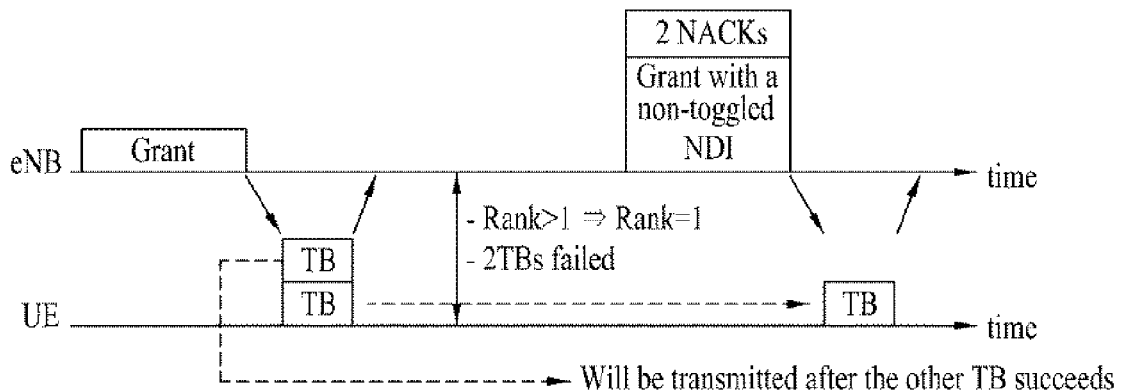

FIG. 11 to FIG. 13 are diagrams illustrating the HARQ operation according to the second embodiment of the present invention. In particular, FIG. 11 illustrates that a) the base station successfully decodes two transport blocks transmitted from the user equipment, and FIG. 12 illustrates that b) the base station successfully decodes one of two transport blocks and fails to decode the other one, or fails to receive the transport blocks. Also, FIG. 13 illustrates that c) the base station fails to decode or receive two transport blocks.

First of all, referring to FIG. 11, the base station, which has successfully decoded two transport blocks transmitted from the user equipment, transmits two ACK responses and uplink grant with a toggled NDI to the user equipment. In this case, the two ACK responses correspond to the two transport blocks received from the user equipment.

The user equipment flushes a buffer for transmitting to rank 1 in accordance with the toggled NDI, and performs new transmission. Alternatively, the user equipment flushes the buffer and performs new transmission by identifying that the responses received from the base station regardless of the uplink grant are all ACK responses.

Next, referring to FIG. 12, if the base station successfully decodes one of two transport blocks transmitted from the user equipment and fails to decode the other one, or fails to receive the transport blocks, it transmits one ACK response and one NACK response, and also transmits uplink grant with a non-toggled NDI to the user equipment. In this case, the user equipment performs retransmission without flushing the buffer that stores the transport block corresponding to the NACK response in accordance with the non-togged NDI. At this time, it is preferable that the buffer that stores the transport block corresponding to the ACK response is not considered.

Finally, referring to FIG. 13, if the base station fails to decode or receive two transport blocks, it transmits two NACK responses and uplink grant with a non-toggled NDI to the user equipment.

In this case, the user equipment performs retransmission without flushing the two buffers in accordance with the non-togged NDI. Alternatively, the user equipment may perform retransmission without flushing the buffers by identifying that the responses received from the base station regardless of the uplink grant are all NACK responses.

However, the order of the transport blocks, which are retransmitted, may be set previously, or information as to the order of the transport blocks may be included in the uplink grant for explicit signaling.

<Case where the Condition for Transmitting Two or More Transport Blocks is Maintained>

According to the third embodiment of the present invention, the case where the condition for transmitting two or more transport blocks is maintained, for example, the case where the user equipment maintains rank 2 will be described.

Figure 14:
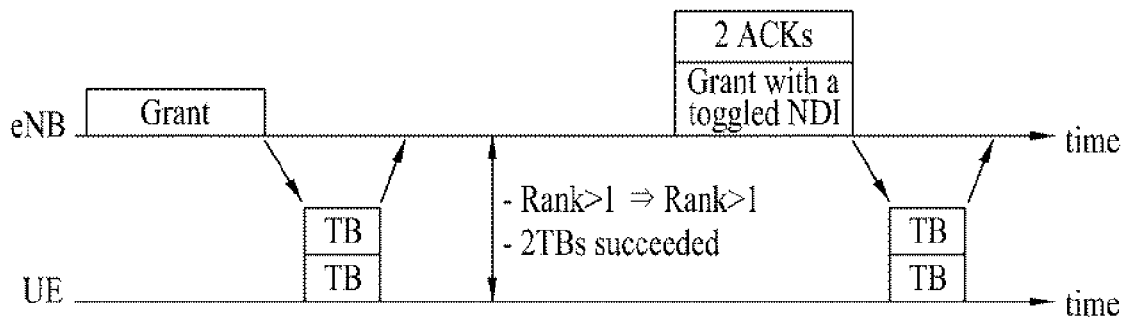
FIG. 14 to FIG. 16 are diagrams illustrating HARQ operation according to the third embodiment of the present invention.
Figure 15:
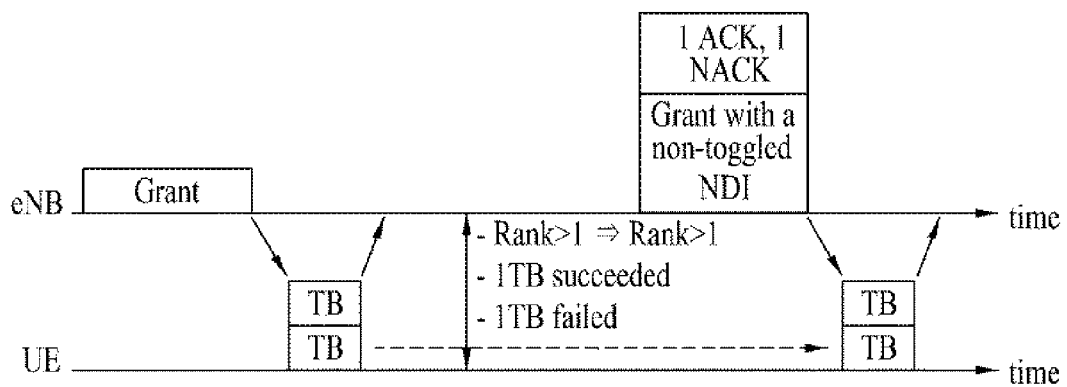
Figure 16:
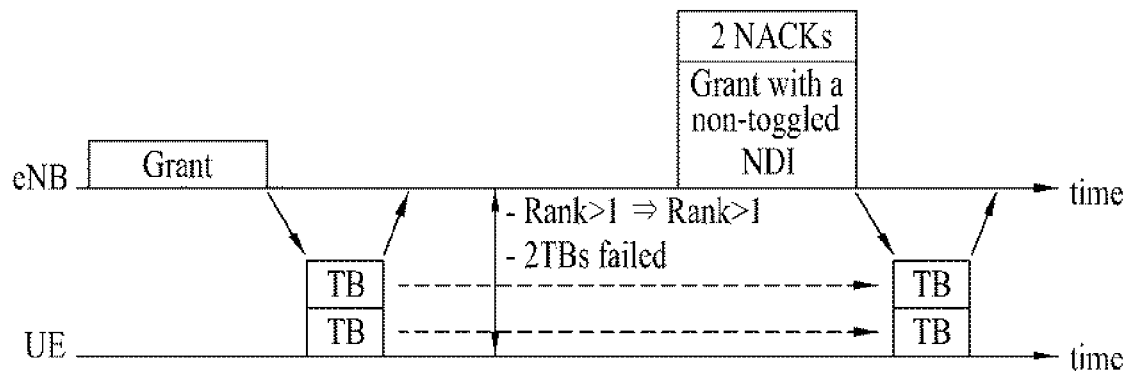

FIG. 14 to FIG. 16 are diagrams illustrating the HARQ operation according to the third embodiment of the present invention. In particular, FIG. 14 illustrates that a) the base station successfully decodes two transport blocks transmitted from the user equipment, and FIG. 15 illustrates that b) the base station successfully decodes one of two transport blocks and fails to decode the other one, or fails to receive the transport blocks. Also, FIG. 16 illustrates that c) the base station fails to decode or receive two transport blocks.

First of all, referring to FIG. 14, the base station, which has successfully decoded two transport blocks transmitted from the user equipment, transmits two ACK responses and uplink grant with a toggled NDI to the user equipment. In this case, the two ACK responses correspond to the two transport blocks received from the user equipment.

The user equipment flushes two buffers in accordance with the toggled NDI, and performs new transmission for the two transport blocks. Alternatively, the user equipment flushes the two buffers and performs new transmission by identifying that the responses received from the base station regardless of the uplink grant are all ACK responses.

Next, referring to FIG. 15, if the base station successfully decodes one of two transport blocks transmitted from the user equipment and fails to decode the other one, or fails to receive the transport blocks, it transmits one ACK response and one NACK response, and also transmits uplink grant with a non-toggled NDI to the user equipment. In this case, the user equipment performs retransmission without flushing the buffer that stores the transport block corresponding to the NACK response in accordance with the non-toggled NDI, and performs new transmission by flushing the buffer that stores the transport block corresponding to the ACK response.

Meanwhile, although FIG. 15 illustrates that the NDI is not toggled, the same operation can be performed using ACK response and NACK response, which are received at the same time, even in the case that the NDI is toggled.

Finally, referring to FIG. 16, if the base station fails to decode or receive two transport blocks, it transmits two NACK responses and uplink grant with a non-toggled NDI to the user equipment.

In this case, the user equipment performs retransmission without flushing the two buffers in accordance with the non-togged NDI. Alternatively, the user equipment may perform retransmission without flushing the buffers by identifying that the responses received from the base station regardless of the uplink grant are all NACK responses.

Figure 17:
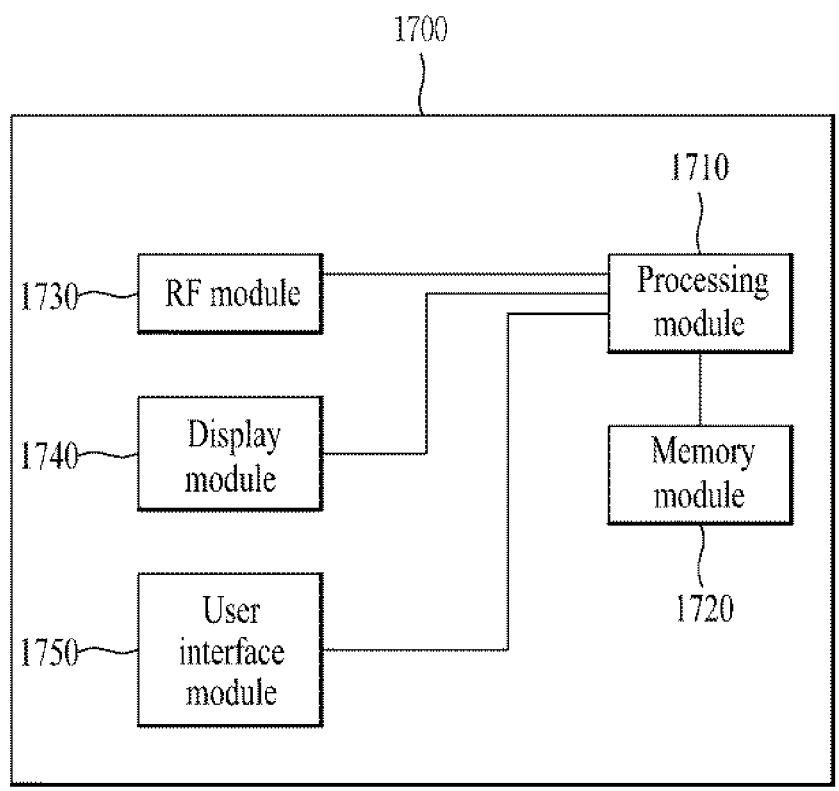

FIG. 17 is a block diagram illustrating a user equipment according to the embodiment of the present invention.

Referring to FIG. 17, the user equipment 1700 includes a processing module 1710, a memory module 1720, a radio frequency (RF) module 1730, a display module 1740, and a user interface module 1750.

The user equipment 1700 is illustrated for convenience of description, and some modules of the user equipment 1700 may be omitted. Also, the user equipment 1700 may further include required modules. Furthermore, some modules of the user equipment 1700 may be divided into segmented modules. The processing module 1710 is configured to perform the operation according to the embodiment of the present invention, which is illustrated with reference to the accompanying drawings.

In detail, the processing module 1710 can perform a required operation to multiplex a control signal and a data signal. For the detailed operation of the processing module 1710, refer to the description of FIG. 1 to FIG. 16.

The memory module 1720 is connected with the processing module 1710 and stores an operating system, an application, a program code, data, etc. therein. The RF module 1730 is connected with the processing module 1710 and converts a baseband signal to a radio signal or vice versa. To this end, the RF module 1730 performs analog conversion, amplification, filtering, frequency unlink conversion or their reverse procedures. The display module 1740 is connected with the processing module 1710, and displays various kinds of information. Examples of the display module 1740 include, but not limited to, LCD (Liquid Crystal Display), LED (Light Emitting Diode), and OLED (Organic Light Emitting Diode). The user interface module 1750 is connected with the processing module 1710, and can be configured by combination of well known user interfaces such as key pad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory and then may be driven by a processor. The memory may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Although the aforementioned method for performing retransmission in a MIMO wireless communication system and the apparatus therefor have been described based on the 3GPP LTE system, the method and the apparatus can be applied to various MIMO wireless communication systems in addition to the 3GPP LTE system.

The invention claimed is:

1. A method for performing retransmission at a user equipment in a Multiple-Input Multiple-Output (MIMO) wireless communication system, the method comprising:
    transmitting two transport blocks to a base station using a first uplink grant including a first new data indicator at a first transmission time;
    receiving ACK/NACK (Acknowledgement/Negative-ACK) responses and a second uplink grant including a second new data indicator from the base station, each of the ACK/NACK responses corresponding to one of the two transport blocks; and
    performing new transmission or retransmission for at least one of the two transport blocks at a second transmission time based on the ACK/NACK responses and the second new data indicator,
    wherein the second new data indicator indicates whether to perform the new transmission or the retransmission at the second transmission time when one transport block is to be transmitted at the second transmission time and the ACK/NACK responses include one ACK response and one NACK response.

2. The method of claim 1, further comprising flushing buffers corresponding to the two transport blocks regardless of the second new data indicator when the ACK/NACK responses are all ACK responses.

3. The method of claim 1, further comprising maintaining a buffer corresponding to one of the two transport blocks that has received the NACK response and performing retransmission for the one of the two transport blocks that has received the NACK response when only one transport block is to be transmitted at the second transmission time, the ACK/NACK responses include one ACK response and one NACK response, and the second new data indicator has a same value as the first new data indicator.

4. The method of claim 1, further comprising maintaining buffers corresponding to the two transport blocks regardless of the second new data indicator when the ACK/NACK responses are all NACK responses,
    wherein the second uplink grant further includes information related to an order of the transport blocks to be retransmitted if only one transport block is to be transmitted at the second transmission time.

5. The method of claim 1, further comprising flushing a buffer corresponding to one of the two transport blocks that has received the ACK response and performing the new transmission when only one transport block is to be transmitted at the second transmission time, the ACK/NACK responses include one ACK response and one NACK response, and the second new data indicator has a different value from the first new data indicator.

6. A user equipment comprising:
    a radio frequency (RF) module configured to support Multiple-Input Multiple-Output (MIMO) antennas and to transmit and receive a radio signal externally; and
    a processor operatively coupled to the RF module and configured to:
    transmit two transport blocks to a base station at a first transmission time using a first uplink grant including a first new data indicator;
    receive ACK/NACK (Acknowledgement/Negative-ACK) responses and a second uplink grant including a second new data indicator from the base station, each of the ACK/NACK responses corresponding to one of the two transport blocks; and
    perform new transmission or retransmission for at least one of the two transport blocks at a second transmission time based on the ACK/NACK responses and the second new data indicator,
    wherein the second new data indicator indicates whether to perform the new transmission or the retransmission at the second transmission time when one transport block is to be transmitted at the second transmission time and the ACK/NACK responses include one ACK response and one NACK response.

7. The user equipment of claim 6, wherein the processor is further configured to flush buffers corresponding to the two transport blocks regardless of the second new data indicator when the ACK/NACK responses are all ACK responses.

8. The user equipment of claim 6, wherein the processor is further configured to maintain a buffer corresponding to one of the two transport block that has received the NACK response and to perform retransmission for the one of the two transport blocks that has received the NACK response when only one transport block is to be transmitted at the second transmission time, the ACK/NACK responses include one ACK response and one NACK response, and the second new data indicator has a same value as the first new data indicator.

9. The user equipment of claim 6, wherein the processor is further configured to maintain buffers corresponding to the two transport blocks regardless of the second new data indicator when the ACK/NACK responses are all NACK responses,
    wherein the second uplink grant further includes information related to an order of the transport blocks to be retransmitted if only one transport block is to be transmitted at the second transmission time.

10. The user equipment of claim 6, wherein the processor is further configured to flush a buffer corresponding to one of the two transport blocks that has received the ACK response and to perform the new transmission when only one transport block is to be transmitted at the second transmission time, the ACK/NACK responses include one ACK response and one NACK response, and the second new data indicator has a different value from the first new data indicator.

* * * * *